(12) United States Patent
Zhou et al.

(10) Patent No.: US 11,129,165 B2
(45) Date of Patent: Sep. 21, 2021

(54) METHOD FOR TRANSMITTING CARRIER, BASE STATION, USER EQUIPMENT, AND SYSTEM

(71) Applicant: Huawei Technologies Co., Ltd., Shenzhen (CN)

(72) Inventors: Guohua Zhou, Shanghai (CN); Zhenfei Tang, Ottawa (CA); Yueying Zhao, Shanghai (CN); Hao Tang, Shanghai (CN); Peng Zhang, Shanghai (CN); Dongdong Wei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/397,528

(22) Filed: Apr. 29, 2019

(65) Prior Publication Data

US 2019/0261372 A1     Aug. 22, 2019

Related U.S. Application Data

(63) Continuation of application No. PCT/CN2017/104548, filed on Sep. 29, 2017.

(30) Foreign Application Priority Data

Nov. 4, 2016   (CN) .......................... 201610966093.2

(51) Int. Cl.
*H04W 72/04*     (2009.01)
*H04L 5/00*      (2006.01)
(Continued)

(52) U.S. Cl.
CPC ....... *H04W 72/0453* (2013.01); *H04L 5/0048* (2013.01); *H04W 72/04* (2013.01);
(Continued)

(58) Field of Classification Search
CPC ................ H04L 5/0048; H04L 1/0001; H04L 5/005–0051; H04L 27/2611; H04L 47/10;
(Continued)

(56) References Cited

U.S. PATENT DOCUMENTS 9,258,807 B2 *   2/2016   Choi ..................... H04L 5/0007
10,200,176 B2    2/2019   Seo et al.
(Continued)

FOREIGN PATENT DOCUMENTS

CN   105659518 A   6/2016
CN   105873069 A   8/2016
(Continued)

OTHER PUBLICATIONS

3GPP TR 38.802 V0.1.0, "3rd Generation Partnership Project; Technical Specification Group Radio Access Network; Study on New Radio (NR) Access Technology; Physical Layer Aspects (Release 14);" Aug. 2016, 31 pages.
(Continued)

*Primary Examiner* — Thomas R Cairns
(74) *Attorney, Agent, or Firm* — Slater Matsil, LLP

(57) ABSTRACT

The present invention relates to the field of wireless communications technologies, and provides a method for transmitting a carrier, a base station, user equipment, and a system. The method discloses: sending, by a base station, a second carrier, where the second carrier at least partially shares a same resource area with a first carrier, the resource area includes a plurality of resource elements, and the first carrier and the second carrier occupy different resource elements; and sending, by the base station, blank resource element indication information to user equipment that receives the second carrier, where the blank resource element indication information is used to indicate a position of a resource element occupied by the first carrier in the shared (Continued)

resource area. According to the solutions provided in the embodiments, a resource utilization rate of a communications system is improved, and interference between carriers is avoided.

24 Claims, 16 Drawing Sheets

(51) Int. Cl.
*H04W 72/08* (2009.01)
*H04W 72/12* (2009.01)

(52) U.S. Cl.
CPC ......... *H04W 72/08* (2013.01); *H04W 72/082* (2013.01); *H04W 72/12* (2013.01)

(58) Field of Classification Search
CPC . H04W 72/04; H04W 72/0453; H04W 72/08; H04W 72/082; H04W 72/12; H04W 8/20; H04W 16/14; H04W 28/065; H04W 28/10; H04W 28/12; H04W 36/0094; H04W 52/0216; H04W 72/0406; H04W 72/042; H04W 72/044–0473; H04W 72/1263–1273; H04W 72/1278–1294; H04W 72/1289; H04W 72/14; H04W 74/002; H04W 76/28
See application file for complete search history.

(56) References Cited

U.S. PATENT DOCUMENTS

| | | | |
|---|---|---|---|
| 10,548,124 | B2 | 1/2020 | Chen et al. |
| 2011/0268046 | A1 | 11/2011 | Choi et al. |
| 2014/0098754 | A1* | 4/2014 | Luo ............ H04L 5/0053 370/329 |
| 2015/0103777 | A1 | 4/2015 | Chen et al. |
| 2017/0257772 | A1 | 9/2017 | Zhou et al. |
| 2019/0053065 | A1 | 2/2019 | Zhao et al. |
| 2019/0281610 | A1* | 9/2019 | Choi ............ H04L 5/0035 |

FOREIGN PATENT DOCUMENTS

| | | |
|---|---|---|
| EP | 3211948 A1 | 8/2017 |
| JP | 2013521740 A | 6/2013 |
| KR | 20160070115 A | 6/2016 |
| WO | 2014168538 | 10/2014 |
| WO | 2015188164 A1 | 12/2015 |
| WO | 2016082084 A1 | 6/2016 |
| WO | 2016100319 A1 | 6/2016 |

OTHER PUBLICATIONS

Huawei et al., "Coexistence between NR and LTE," 3GPP TSG RAN WG1 Meeting #87, R1-1611681,Reno, USA, Nov. 14-18, 2016, 6 pages.

Huawei et al., "Discussion on blank resources," 3GPP TSG RAN WG1 Meeting #86bis, R1-1608842, Lisbon, Portugal, Oct. 10-14, 2016, 2 pages.

* cited by examiner

METHOD FOR TRANSMITTING CARRIER, BASE STATION, USER EQUIPMENT, AND SYSTEM

CROSS-REFERENCE TO RELATED APPLICATIONS

This application is a continuation of International Application No. PCT/CN2017/104548, filed on Sep. 29, 2017, which claims priority to Chinese Patent Application No. 201610966093.2, filed on Nov. 4, 2016. The disclosures of the aforementioned applications are hereby incorporated by reference in their entireties.

TECHNICAL FIELD

The present invention relates to the field of wireless communications technologies, and in particular, to a method for transmitting a carrier, a base station, user equipment, and a system.

BACKGROUND

In a wireless communications system, each carrier is usually deployed in a frequency division multiplexing (FDM) manner, and a guard interval is reserved between two carriers. For example, a carrier 1 occupies a fixed bandwidth of 10 MHz, a carrier 2 occupies a fixed bandwidth of 20 MHz, and a guard interval bandwidth is reserved between the carrier 1 and the carrier 2.

A conventional carrier bandwidth is usually fixed. For example, a carrier bandwidth in a universal mobile telecommunications system (UMTS) is a fixed bandwidth of 5 MHz, and a carrier bandwidth in Long Term Evolution (LTE) is a fixed bandwidth of 1.4 MHz, 3 MHz, 5 MHz, 15 MHz, 20 MHz, or the like. However, when the carrier bandwidth is fixed, spectrum resources are wasted when the spectrum is irregular. Therefore, to resolve this problem, in the prior art, a width of a carrier may be defined as a variable bandwidth. For example, a bandwidth of a carrier may be flexibly set from 3 MHz to 10 MHz. A variation granularity may be a granularity of one physical resource block (PRB) (180 K) or a granularity of one subcarrier (15 K).

However, there is no actual application scenario of carrier overlapping in the prior art. Two carriers can be enabled, through partial or entire carrier overlapping, to share a spectrum resource, thereby improving a spectrum utilization rate. Therefore, it is necessary to consider implementing an application scenario of carrier overlapping. However, at an overlapping part of two carriers, if the two carriers simultaneously transmit a signal by using a same time-frequency resource, mutual interference between the carriers is caused. Consequently, the two carriers cannot normally work.

SUMMARY

Embodiments of the present invention provide a method for transmitting a carrier, a base station, user equipment, and a system, to resolve a problem in an application scenario of carrier overlapping that mutual interference exists between carriers, and consequently the carriers cannot normally work.

According to a first aspect, an embodiment of the present invention provides a method for sending a carrier, including: sending, by a base station, a second carrier, where the second carrier at least partially shares a same resource area with a first carrier, the resource area includes a plurality of resource elements, and the first carrier and the second carrier occupy different resource elements; and sending, by the base station, blank resource element indication information to user equipment that receives the second carrier, where the blank resource element indication information is used to indicate a position of a resource element occupied by the first carrier in the shared resource area.

In this embodiment of the present invention, the first carrier and the second carrier may share a same resource area. For example, the first carrier and the second carrier completely overlap, partially overlap, or excessively overlap in the same resource area. A resource utilization rate may be improved in a manner of sharing a resource by the two carriers. In addition, the base station notifies the UE of the blank resource element indication information, so that the UE can determine the position of the resource element occupied by the first carrier in the shared resource area, thereby avoiding causing interference to the first carrier.

In a possible implementation, the resource area may be a resource in time domain, for example, an OFDM symbol (or referred to as a symbol), a slot, or a subframe. The resource area may alternatively be a resource in frequency domain, for example, a frequency domain bandwidth, a PRB, or a subcarrier. The resource area may alternatively be a resource in space domain. A resource element may be a basic constituent unit of the resource area, for example, an OFDM symbol, a subcarrier, or a resource element (RE).

In a possible implementation, the blank resource element indication information may include a pattern identifier, the pattern identifier indicates one or more fixed patterns, and the fixed pattern is used to identify the position of the resource element occupied by the first carrier. For example, positions of pilot channels such as a CRS and a CSI-RS of the first carrier may be identified by using a fixed pattern. Optionally, the blank resource element indication information may further include a shift value and/or a position density. The shift value may be a shift value in frequency domain, or may be a shift value in time domain. The position density may be a pilot density or an antenna quantity.

In a possible implementation, the blank resource element indication information includes one or more physical parameters, and the physical parameter is used to determine the position of the resource element occupied by the first carrier. For example, these physical parameters may include a quantity of symbols shifted in time domain, a quantity of subcarriers shifted in frequency domain (or a physical cell ID), an antenna port quantity (or a pilot density or a density index), a subframe number, an overlapping bandwidth, a slot number, a frame number, and the like. A position of a reference signal such as a CRS or a CSI-RS of the first carrier may be calculated by using these physical parameters.

In a possible implementation, the blank resource element indication information includes a quantity of symbols in time domain and/or a bandwidth in frequency domain. For example, a position of a control region signal (for example, a PCFICH, a PDCCH, or a PHICH) of the first carrier may be determined by using the blank resource element indication information. Optionally, the blank resource element indication information may further include a start position of the control region signal of the first carrier.

Optionally, the first carrier comes from a first system, and the second carrier comes from a second system. For example, the first system may be an LTE system, and the second system may be an NR system; or the first system may be an NR system, and the second system may be an LTE system. Optionally, the first carrier and the second carrier may alternatively come from a same system. When the first carrier and the second carrier come from different systems, according to the technical solution of the present invention, compatibility between the two systems can be effectively implemented, and a resource utilization rate is improved.

According to a second aspect, an embodiment of the present invention provides a method for receiving a carrier, including: receiving, by user equipment, a second carrier, where the second carrier at least partially shares a same resource area with a first carrier, the resource area includes a plurality of resource elements, and the first carrier and the second carrier occupy different resource elements; and obtaining, by the user equipment, blank resource element indication information, where the blank resource element indication information is used to indicate a position of a resource element occupied by the first carrier in the shared resource area.

In this embodiment of the present invention, the first carrier and the second carrier may share a same resource area. For example, the first carrier and the second carrier completely overlap, partially overlap, or excessively overlap in the same resource area. A resource utilization rate may be improved in a manner of sharing a resource by the two carriers. In addition, the UE obtains the blank resource element indication information from the base station, so that the UE can determine the position of the resource element occupied by the first carrier in the shared resource area, thereby avoiding causing interference to the first carrier.

In a possible implementation, the resource area may be a resource in time domain, for example, an OFDM symbol (or referred to as a symbol), a slot, or a subframe. The resource area may alternatively be a resource in frequency domain, for example, a frequency domain bandwidth, a PRB, or a subcarrier. The resource area may alternatively be a resource in space domain. A resource element may be a basic constituent unit of the resource area, for example, an OFDM symbol, a subcarrier, or a resource element (RE).

In a possible implementation, the blank resource element indication information may include a pattern identifier, the pattern identifier indicates one or more fixed patterns, and the fixed pattern is used to identify the position of the resource element occupied by the first carrier. For example, positions of pilot channels such as a CRS and a CSI-RS of the first carrier may be identified by using a fixed pattern. Optionally, the blank resource element indication information may further include a shift value and/or a position density. The shift value may be a shift value in frequency domain, or a shift value in time domain. The position density may be a pilot density or an antenna quantity.

In a possible implementation, the blank resource element indication information includes one or more physical parameters, and the physical parameter is used to determine the position of the resource element occupied by the first carrier. For example, these physical parameters may include a quantity of symbols shifted in time domain, a quantity of subcarriers shifted in frequency domain (or a physical cell ID), an antenna port quantity (or a pilot density or a density index), a subframe number, an overlapping bandwidth, a slot number, a frame number, and the like. A position of a reference signal such as a CRS or a CSI-RS of the first carrier may be calculated by using these physical parameters.

In a possible implementation, the blank resource element indication information includes a quantity of symbols in time domain and/or a bandwidth in frequency domain. For example, a position of a control region signal (for example, a PCFICH, a PDCCH, or a PHICH) of the first carrier may be determined by using the blank resource element indication information. Optionally, the blank resource element indication information may further include a start position of the control region signal of the first carrier.

Optionally, the first carrier comes from a first system, and the second carrier comes from a second system. For example, the first system may be an LTE system, and the second system may be an NR system; or the first system may be an NR system, and the second system may be an LTE system. Optionally, the first carrier and the second carrier may alternatively come from a same system. When the first carrier and the second carrier come from different systems, according to the technical solution of the present invention, compatibility between the two systems can be effectively implemented, and a resource utilization rate is improved.

According to a third aspect, an embodiment of the present invention provides a base station. The base station has a function of implementing actual behavior of the base station in the foregoing method. The function may be implemented by using hardware, or may be implemented by using hardware executing corresponding software. The hardware or software includes one or more modules corresponding to the foregoing function.

In a possible design, a structure of the base station includes a processor and a transceiver, and the processor is configured to support the base station in executing the corresponding function in the foregoing method. The transceiver is configured to: support communication between the base station and UE, send information or an instruction in the foregoing method to the UE, and receive information or an instruction sent by the base station. The base station may further include a memory. The memory is configured to: be coupled to the processor, and store a program instruction and data that are necessary for the base station.

According to a fourth aspect, an embodiment of the present invention provides UE. The UE has a function of implementing behavior of the UE in the foregoing method design. The function may be implemented by using hardware. A structure of the UE includes a transceiver and a processor. The function may alternatively be implemented by using hardware executing corresponding software. The hardware or software includes one or more modules corresponding to the foregoing function. The module may be software and/or hardware.

According to another aspect, an embodiment of the present invention provides a communications system. The system includes the base station and the UE according to the foregoing aspects.

According to still another aspect, an embodiment of the present invention provides a computer storage medium, configured to store a computer software instruction used by the foregoing base station, and the computer storage medium includes a program designed for executing the foregoing aspects.

According to yet another aspect, an embodiment of the present invention provides a computer storage medium, configured to store a computer software instruction used by the foregoing UE, and the computer storage medium includes a program designed for executing the foregoing aspects.

According to the technical solutions provided in the embodiments of the present invention, the second carrier at least partially shares a same resource area with the first carrier, so that overlapping between the first carrier and the second carrier is implemented, thereby improving a resource utilization rate in the communications system. In addition, the embodiments of the present invention provide a manner of determining the position of the resource element occupied by the first carrier in the shared resource area, and the base station may generate the blank resource element indication information based on the determining manner, and notify the UE of the blank resource element indication information, so that the UE can identify these positions and receive signals without using these positions, thereby avoiding causing mutual interference between carriers.

BRIEF DESCRIPTION OF THE DRAWINGS

To describe embodiments of the present invention more clearly, the following briefly describes accompanying drawings required for describing the embodiments.

DETAILED DESCRIPTION OF ILLUSTRATIVE EMBODIMENTS

The following clearly describes technical solutions in embodiments of the present invention with reference to the accompanying drawings in the embodiments of the present invention.

Figure 1A:
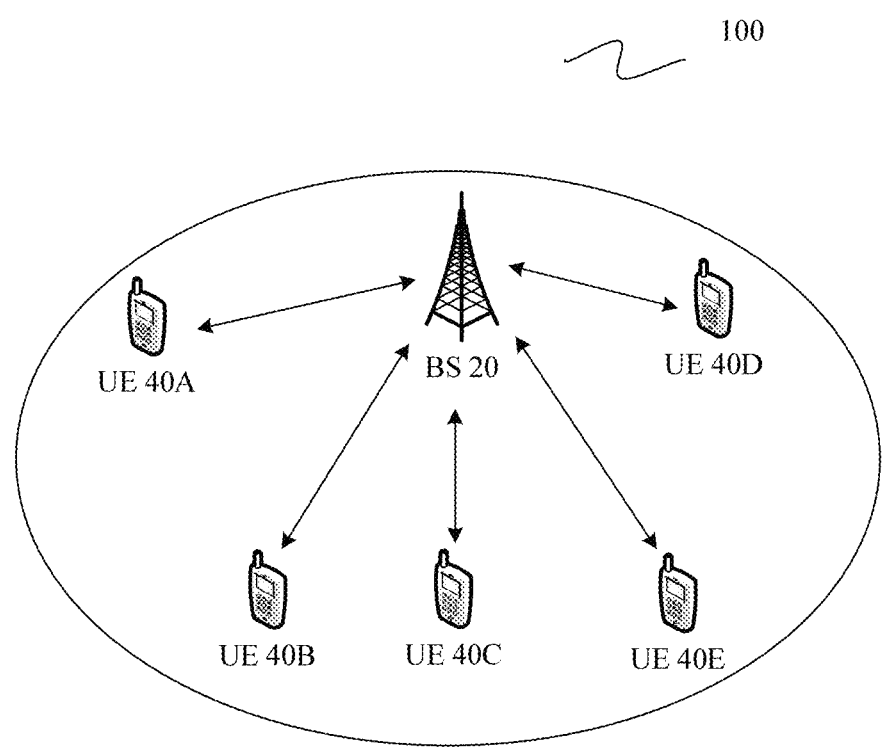
FIG. 1A is a schematic diagram of a communications system according to an embodiment of the present invention.
Figure 1B:
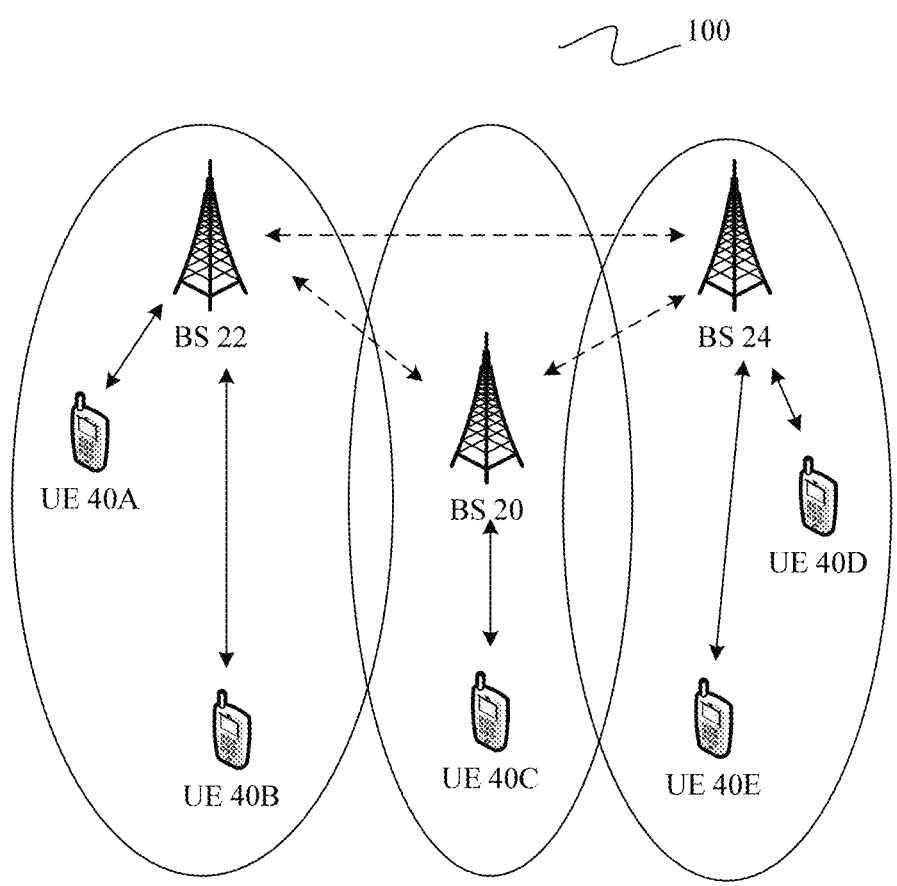
FIG. 1B is a schematic diagram of a communications system according to an embodiment of the present invention.
Figure 1C:
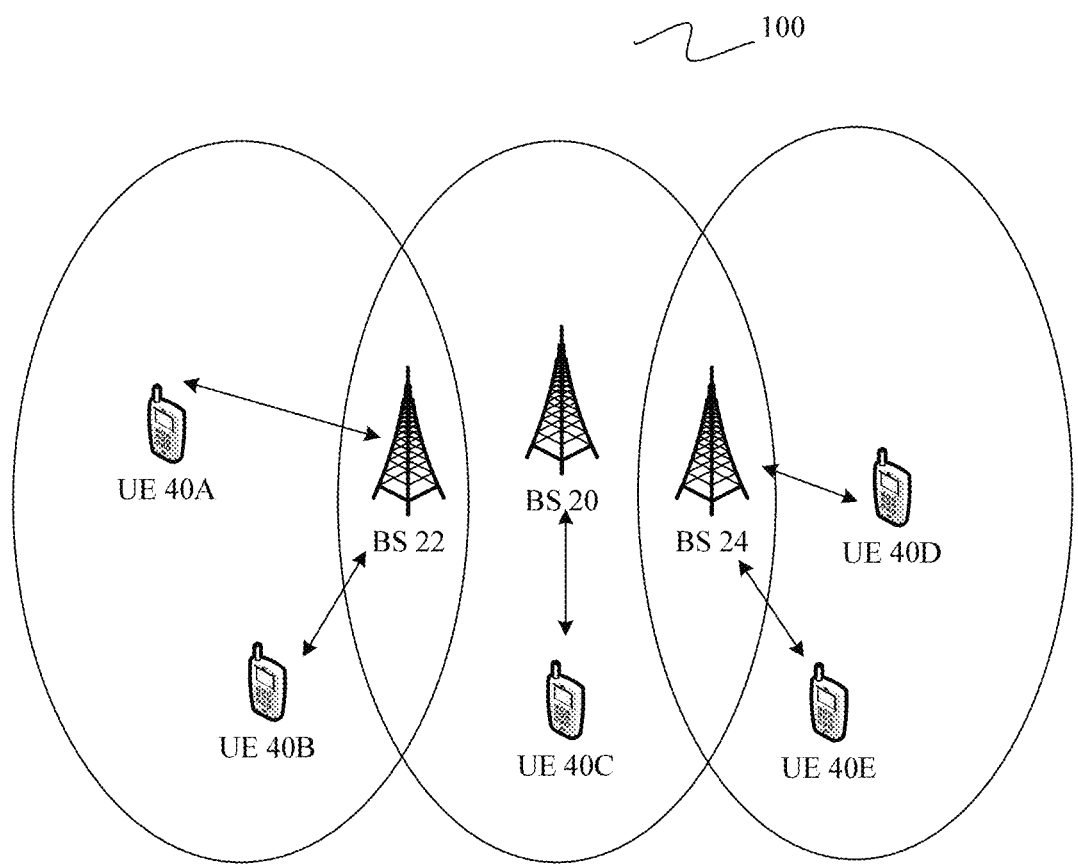
FIG. 1C is a schematic diagram of a communications system according to an embodiment of the present invention.

To resolve a problem in the prior art that in an existing communications system, mutual interference exists between carriers during carrier overlapping, and consequently the carriers cannot normally work, the embodiments of the present invention provide a solution based on a communications system shown in FIG. 1A, FIG. 1B, or FIG. 1C, to cancel interference between carriers while improving a resource utilization rate of the communications system.

As shown in FIG. 1A, FIG. 1B, and FIG. 1C, the embodiments of the present invention provide a communications system 100. The communications system 100 includes at least one base station (BS) and a plurality of UEs. For example, in FIG. 1A, FIG. 1B, and FIG. 1C, the plurality of UEs may be separately identified as UE 40A to UE 40E.

In the solutions of the embodiments, for example, in the communications system 100 in FIG. 1A, the plurality of UEs may be located in coverage of a same base station, and may be served by a same base station. For example, in FIG. 1A, the UE 40A to the UE 40E are all located in coverage of a base station 20, and are served by the base station 20.

Optionally, as shown in FIG. 1B, the plurality of UEs in the communications system 100 may alternatively be located in coverage of different base stations. For example, a base station 20, a base station 22, and a base station 24 are included in FIG. 1B. UE 40A and UE 40B are located in coverage of the base station 22, and are served by the base station 22. UE 40C is located in coverage of the base station 20, and is served by the base station 20; and UE 40D and UE 40E are located in coverage of the base station 24, and are served by the base station 24.

FIG. 1C differs from FIG. 1B in that there is an overlapping coverage between two base stations in the communications system 100. As shown in FIG. 1C, a base station 20 is located in coverage of the base station 20, a base station 22 is located in overlapping coverage of the base station 20 and the base station 22, and a base station 24 is located in overlapping coverage of the base station 20 and the base station 24.

In the embodiments of the present invention, the communications system 100 may be various radio access technology (RAT) systems, such as a Code Division Multiple Access (CDMA) system, a Time Division Multiple Access (TDMA) system, a Frequency Division Multiple Access (FDMA) system, an orthogonal frequency division multiple access (OFDMA) system, a single carrier frequency division multiple access (single carrier FDMA, SC-FDMA) system, and other systems. The terms "system" and "network" may be interchangeable. The CDMA system may implement a wireless technology, such as Universal Terrestrial Radio Access (UTRA) or CDMA 2000. The UTRA may include a wideband CDMA (WCDMA) technology and another variant of the CDMA technology. The CDMA 2000 may cover an interim standard (IS) 2000 (IS-2000), an IS-95 standard, and an IS-856 standard. The TDMA system may implement a wireless technology, for example, a Global System for Mobile Communications (GSM). The OFDMA system may implement a wireless technology, such as Evolved Universal Terrestrial Radio Access (evolved UTRA, E-UTRA), Ultra Mobile Broadband (UMB), the IEEE 802.11 (Wi-Fi), the IEEE 802.16 (WiMAX), the IEEE 802.20, or Flash OFDMA. The UTRA and the E-UTRA correspond to the UMTS and an evolved release of the UMTS. In 3GPP standards, the Long Term Evolution (LTE) and various LTE-based evolved releases are new releases of the UMTS that use the E-UTRA. In addition, the communications system 100 may be further applicable to a future-proofed communications technology, for example, a new radio (NR) system, namely, a 5G system. The technical solutions provided in the embodiments of the present invention are applicable to any communications technology that can implement carrier overlapping. A system architecture and a service scenario that are described in the embodiments of the present invention are used to describe the technical solutions of the embodiments of the present invention more clearly, and do not constitute a limitation to the technical solutions provided in the embodiments of the present invention. A person of ordinary skill in the art can learn that with evolution of a network architecture and appearance of a new service scenario, the technical solutions provided in the embodiments of the present invention are also applicable to similar technical problems. The communications system 100 of the embodiments of the present invention may implement only one system, or may implement a plurality of systems at a time, for example, implement an LTE system and an NR system at a time. Any base station or UE in the communications system 100 may support only one system, or may support a plurality of systems at a time. For example, in FIG. 1A, FIG. 1B, and FIG. 1C, the base station 20, the base station 22, and the base station 24 may support one system, or may support a plurality of systems at a time. The UE 40A to the UE 40E may support one system, or may support a plurality of systems at a time.

In the embodiments of the present invention, the base station (for example, the base station 20, the base station 22, and the base station 24) is an apparatus deployed in a radio access network to provide a wireless communication function for UE. The base station may include a macro base station, a micro base station (also referred to as a small cell), a relay station, an access point, and the like in various forms. In systems using different radio access technologies, names of devices having a base station function may be different. For example, a device having a base station function is referred to as an evolved NodeB (eNB or eNodeB) in an LTE system, a NodeB in a 3rd Generation (3G) system, and the like. For ease of description, in all the embodiments of the present invention, the foregoing apparatuses that provide a wireless communication function for UE are collectively referred to as a base station or a BS.

The UE used in the embodiments of the present invention may include various handheld devices, vehicular devices, wearable devices, and computing devices that have a wireless communication function, or another processing device connected to a wireless modem. Alternatively, the UE may be referred to as a mobile station (MS), a terminal, or terminal equipment, and may include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or the like. For ease of description, in all embodiments of the present invention, the devices mentioned above are collectively referred to as UE.

It should be noted that a system type supported in the communications system 100 shown in FIG. 1A, FIG. 1B, and FIG. 1C, and quantities and types of the base stations and UEs included in the system are merely an example. The embodiments of the present invention are not limited thereto. For brief descriptions, details are not described in the accompanying drawings. In addition, in the communications system 100 shown in FIG. 1A, FIG. 1B, and FIG. 1C, although the base station 20, the base station 22, and the base station 24, and a plurality of UEs are shown, the communications system 100 may include but is not limited to the base stations and the UEs, and may also include, for example, a core network device, or a device for carrying a virtualized network function. This is obvious to a person of ordinary skill in the art, and is not described in detail herein.

Figure 2A:
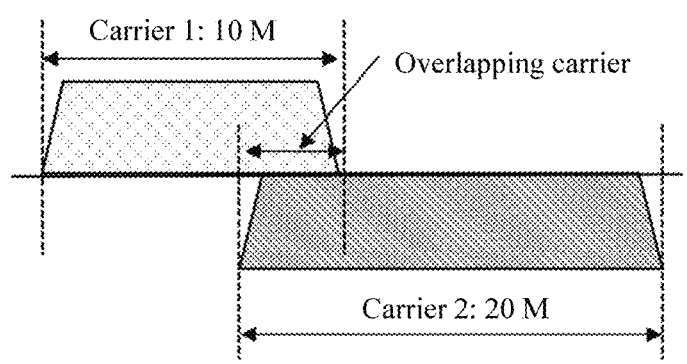
FIG. 2A is a schematic diagram of a carrier overlapping manner according to an embodiment of the present invention.
Figure 2B:
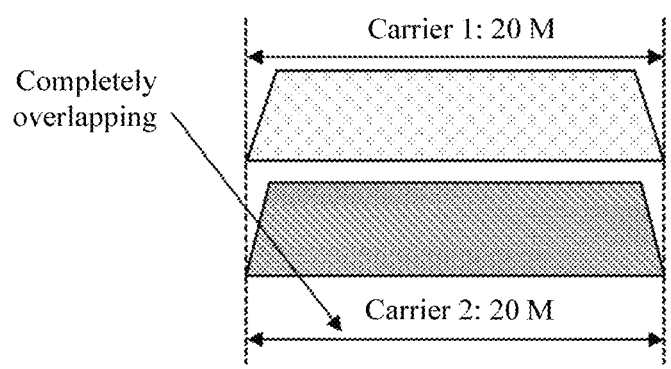
FIG. 2B is a schematic diagram of a carrier overlapping manner according to an embodiment of the present invention.
Figure 2C:
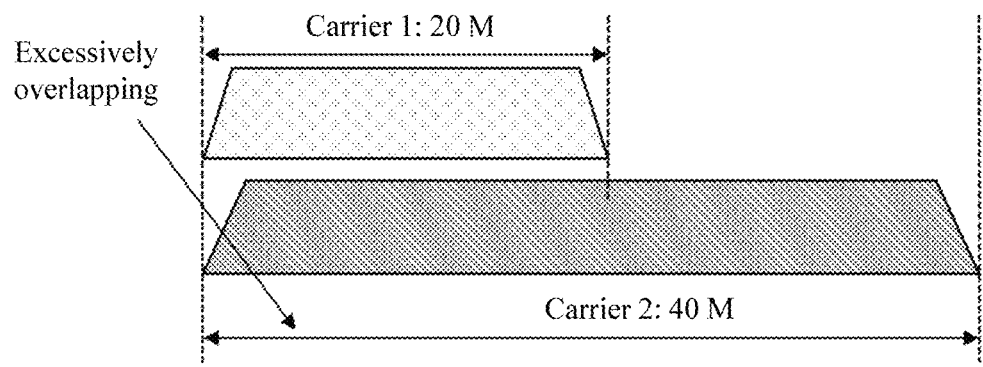
FIG. 2C is a schematic diagram of a carrier overlapping manner according to an embodiment of the present invention.

In the technical solutions of the present invention, overlapping between two carriers is allowed, and respective signals of the two carriers are flexibly and simultaneously sent in an overlapping area, so that the two carriers can share an overlapping spectrum resource, thereby improving a frequency utilization rate. For carrier overlapping manners, refer to FIG. 2A, FIG. 2B, and FIG. 2C. As shown in FIG. 2A, FIG. 2B, and FIG. 2C, the embodiments of the present invention provide three carrier overlapping manners. As shown in FIG. 2A, a carrier 1 and a carrier 2 partially overlap. As shown in FIG. 2B, a carrier 1 and a carrier 2 completely overlap. As shown in FIG. 2C, a carrier 2 overlaps a carrier 1 completely and further extends beyond carrier 1. In the embodiments of the present invention, the carrier 1 and the carrier 2 may respectively come from different systems. For example, the carrier 1 may come from an LTE system, and the carrier 2 may come from an NR system. As described above, the communications system 100 may support a plurality of systems at the same time, for example, support an LTE system and an NR system at the same time. Therefore, the carrier 1 and the carrier 2 may come from different systems. Certainly, the embodiments of the present invention are also applicable to a case in which the carrier 1 and the carrier 2 may come from a same system. The embodiments of the present invention do not limit a type of a network system from which the carrier 1 and the carrier 2 come. The LTE system and the NR system herein are merely one of examples, and the embodiments of the present invention are not limited only to the two systems. For ease of description, the embodiments of the present invention are described by mainly using the LTE system and the NR system as an example.

Figure 3:
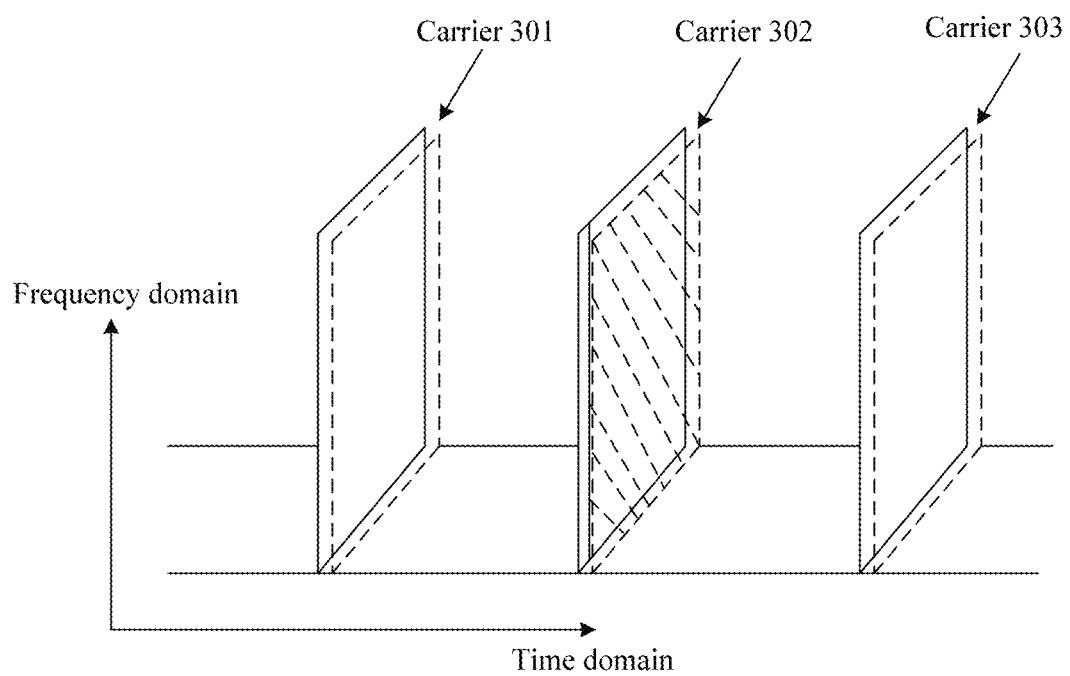
FIG. 3 is a schematic diagram of a manner of sending a carrier according to an embodiment of the present invention.

FIG. 3 is a schematic diagram of a manner of sending a carrier according to an embodiment of the present invention. For example, as shown in FIG. 3, a carrier 301, a carrier 302, and a carrier 303 are included in FIG. 3. A coordinate in a horizontal direction in FIG. 3 represents time domain, and a coordinate in a vertical direction in FIG. 3 represents frequency domain. To improve a spectrum utilization rate, the carrier 301 to the carrier 303 may be formed through overlapping of a carrier 1 and a carrier 2 in a spectrum. For carrier overlapping manners, refer to the embodiments shown in FIG. 2A, FIG. 2B, and FIG. 2C.

Figure 4:
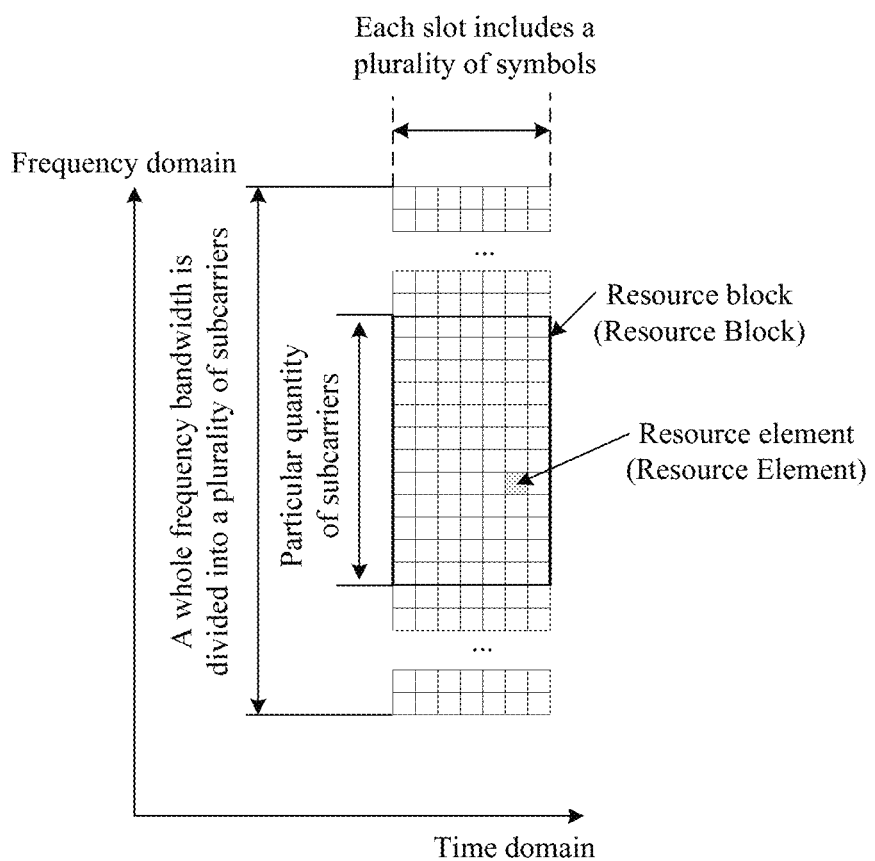
FIG. 4 is a schematic diagram of a manner of configuring a time-frequency resource according to an embodiment of the present invention.

A person skilled in the art may understand that the carrier mentioned in the embodiments of the present invention may be a signal carrier of any format, for example, may be a digital signal or an analog signal. The carrier may occupy a resource in time domain, or may occupy a resource in frequency domain, or may occupy resources in time domain and frequency domain (a time-frequency resource for short) at a time, or may occupy a resource in space domain. In frequency domain, one resource block (RB) may be occupied, or a subcarrier may be used as a granularity, for example, at least two subcarriers are occupied. In time domain, configuration may be performed in a unit of a subframe. For a manner of configuring a time-frequency resource, refer to the embodiment shown in FIG. 4. FIG. 4 is a schematic diagram of a manner of configuring a time-frequency resource according to an embodiment of the present invention. In an OFDM technology, a frequency bandwidth of a subcarrier is 15 KHz, a length of a radio frame is 10 ms, a length of a subframe is 1 ms, and a transmission time interval (TTI), namely a scheduling period, is 1 ms; and resources are flexibly allocated in frequency domain and time domain. As shown in FIG. 4, a 1-ms subframe of each subcarrier may include two slots, and each slot includes six or seven OFDM symbols. One symbol on each subcarrier is defined as a resource element (RE), which is a minimum unit for allocating resources in frequency domain and time domain. Resources including 12 consecutive subcarriers in frequency for one slot are defined as a resource block RB. A base station may allocate resources to different users by using an RB as a granularity, and schedule data transmission. An RB defined at a physical layer is also referred to as a PRB, and each PRB occupies 180 KHz in frequency domain.

Figure 5A:
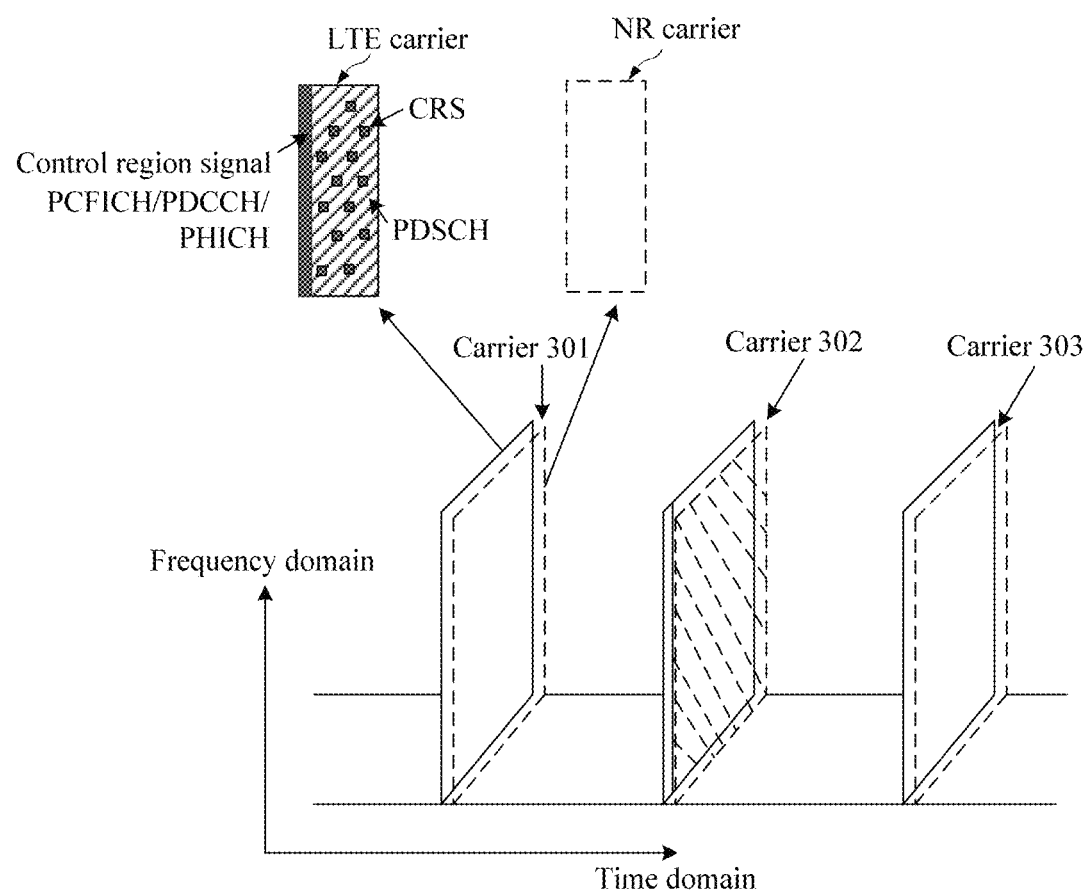
FIG. 5A is a schematic diagram of a manner of sending a carrier according to an embodiment of the present invention.

FIG. 5A is a schematic diagram of a manner of sending a carrier according to an embodiment of the present invention. Referring to FIG. 5A, a manner of sending the carrier 301 in FIG. 3 is described in detail. The carrier 301 may be formed through overlapping of a carrier 1 and a carrier 2 in a spectrum. For example, the carrier 1 may be a carrier from an LTE system (an LTE carrier for short), and the carrier 2 may be a carrier from an NR system (an NR carrier for short). It is assumed that a moment at which the carrier 301 is sent is in an LTE sending slot. In this case, the LTE carrier may occupy a time-frequency resource of the entire carrier 301. Therefore, the carrier 301 may be used to send an LTE control region signal, for example, a physical control format indicator channel (PCFICH), a physical downlink control channel (PDCCH), or a physical HARQ indicator channel (PHICH). The carrier 301 may also be used to send an LTE pilot channel, for example, a cell-specific reference signal (CRS), or a channel state information-reference signal (CSI-RS). The carrier 301 may also be used to send an LTE service channel, for example, a physical downlink shared channel (PDSCH). In this case, to avoid causing interference to the LTE carrier at a spectrum overlapping part, the NR carrier may not send any NR signal at the spectrum overlapping part. For ease of description, an LTE signal in this embodiment of the present invention may be any one or more of an LTE control region signal, an LTE pilot channel, and an LTE service channel. An NR signal may be any one or more of an NR control region signal, an NR pilot channel, and an NR service channel. In some embodiments, an area in which an LTE or NR control region signal is located may be referred to as an LTE or NR control region. The carrier 303 may be sent in a same manner as that of the carrier 301. A manner of sending a carrier 303 is not described in detail again in the present invention.

Figure 5B:
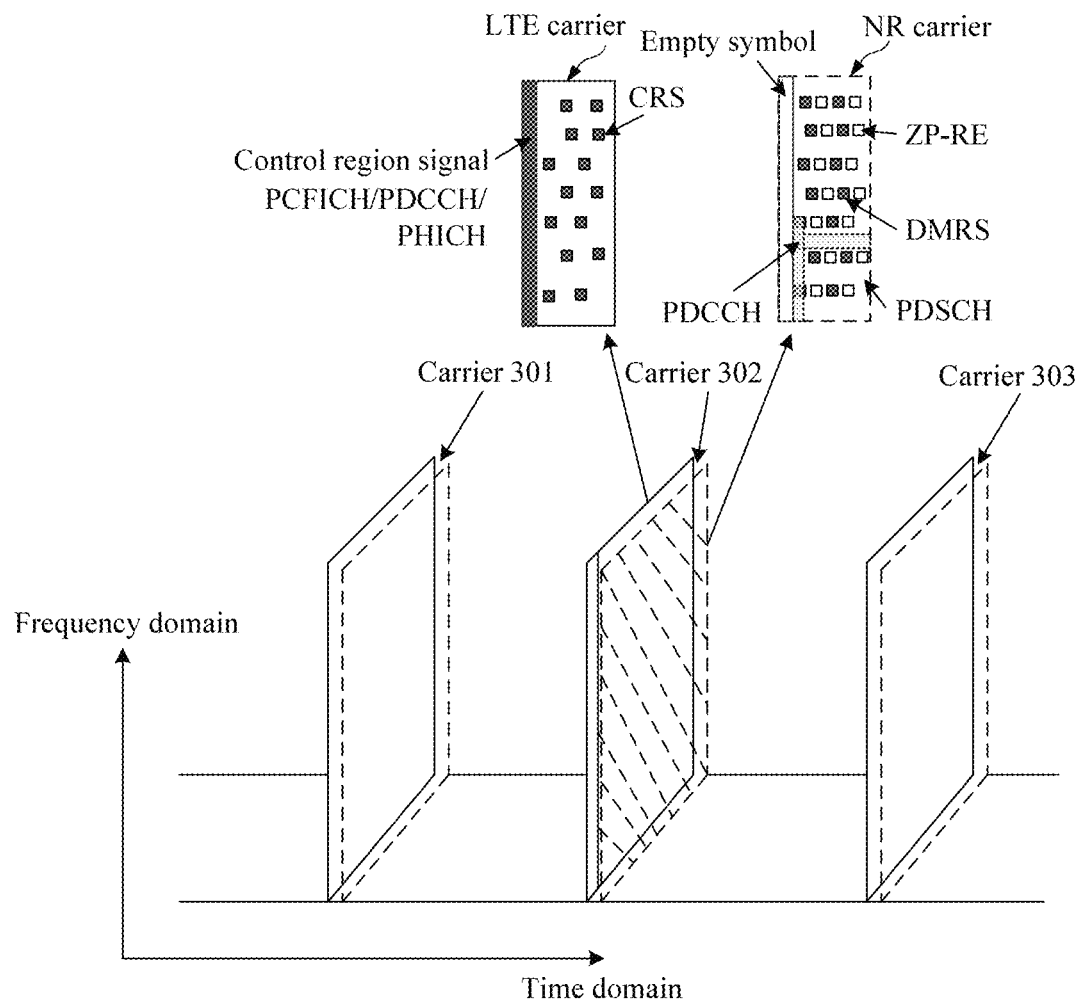
FIG. 5B is a schematic diagram of a manner of sending a carrier according to an embodiment of the present invention.

FIG. 5B is a schematic diagram of a manner of sending a carrier according to an embodiment of the present invention. Referring to FIG. 5B, a manner of sending the carrier 302 in FIG. 3 is described in detail. The carrier 302 may be formed through overlapping of a carrier 1 and a carrier 2. Similarly, an example in which the carrier 1 is an LTE carrier and the carrier 2 is an NR carrier is used for description. It is assumed that a moment at which the carrier 302 is sent is in an NR sending slot. To maintain availability of a cell of an LTE system, an LTE control region signal (for example, including a PCFICH, a PDCCH, and a PHICH), an LTE pilot channel (for example, including a CRS, and a CSI-RS), and the like need to be sent in the NR sending slot, namely, in the carrier 302. However, an LTE physical downlink shared channel may not be scheduled, that is, an LTE signal is not sent. In this case, the NR carrier may use a resource that is unoccupied by the LTE carrier, for example, the LTE physical downlink shared channel. In addition, to avoid causing interference to the LTE carrier at a spectrum overlapping part, an NR signal is not sent at an RE position at which an LTE signal is sent. In other words, for an NR system, an RE position at which an LTE signal is sent and an NR signal is not sent may be set to a zero-power resource element (zero-power RE, ZP-RE) or a muted resource element (muted RE). In other words, the NR system sends no signal at the RE position. In some examples, the ZP-RE or the muted RE may also be referred to as an empty symbol or an empty RE. The ZP-RE, the muted RE, the empty symbol, and the empty RE may refer to a same concept, and may be interchangeable. In an example of this embodiment of the present invention, the ZP-RE may be a time-frequency resource located in an overlapping area of the LTE carrier and the NR carrier. On the time-frequency resource, a base station of the NR system sends no power or sets transmit power to zero, and NR UE receives no signal at the position, or sets receive power to zero. However, a base station and UE of the LTE system may perform communication by using the specific time-frequency resource. Certainly, the ZP-RE may alternatively be a specific time domain resource or frequency domain resource, and has a similar function.

For example, in FIG. 5B, an RE represented by a shadow area on the LTE carrier is used to send an LTE control region signal and an LTE pilot channel, and an RE represented by a blank area sends no LTE signal. On the NR carrier, an empty symbol is used to send an LTE control region signal, and a ZP-RE is used to send an LTE pilot channel. Therefore, an NR signal is sent on an RE, other than an empty symbol and a ZP-RE, on the NR carrier. It can be learned from FIG. 5B that in a spectrum overlapping area of the LTE carrier and the NR carrier, the LTE signal and the NR signal are sent in an exactly separate manner. To be specific, the LTE carrier and the NR carrier separately use respective REs.

For the NR carrier, the ZP-RE and the empty symbol have a same property. In this embodiment of the present invention, the ZP-RE is used as an example for description. Due to existence of the ZP-RE, in the spectrum overlapping area, an NR available resource may be considered to be punctured by the ZP-RE. NR Signals, for example, a PDSCH, a demodulation reference signal (DMRS), and a PDCCH need to avoid a position of the ZP-RE to be accurately received by the NR UE. To enable the NR UE to normally demodulate a received signal, the base station needs to notify the NR UE of the position of the ZP-RE. For vivid description, the position of the ZP-RE may also be referred to as a punctured position. To be specific, the NR UE sorts out a signal at the ZP-RE position.

The position of the ZP-RE includes a position of an LTE pilot channel (a CRS or a CSI-RS) and a position of an LTE control region signal (a PCFICH, a PDCCH, or a PHICH). The four cases are described below.

A first case of determining a punctured position at which a CRS of a carrier 1 (LTE carrier) is located will be described below.

Figure 6:
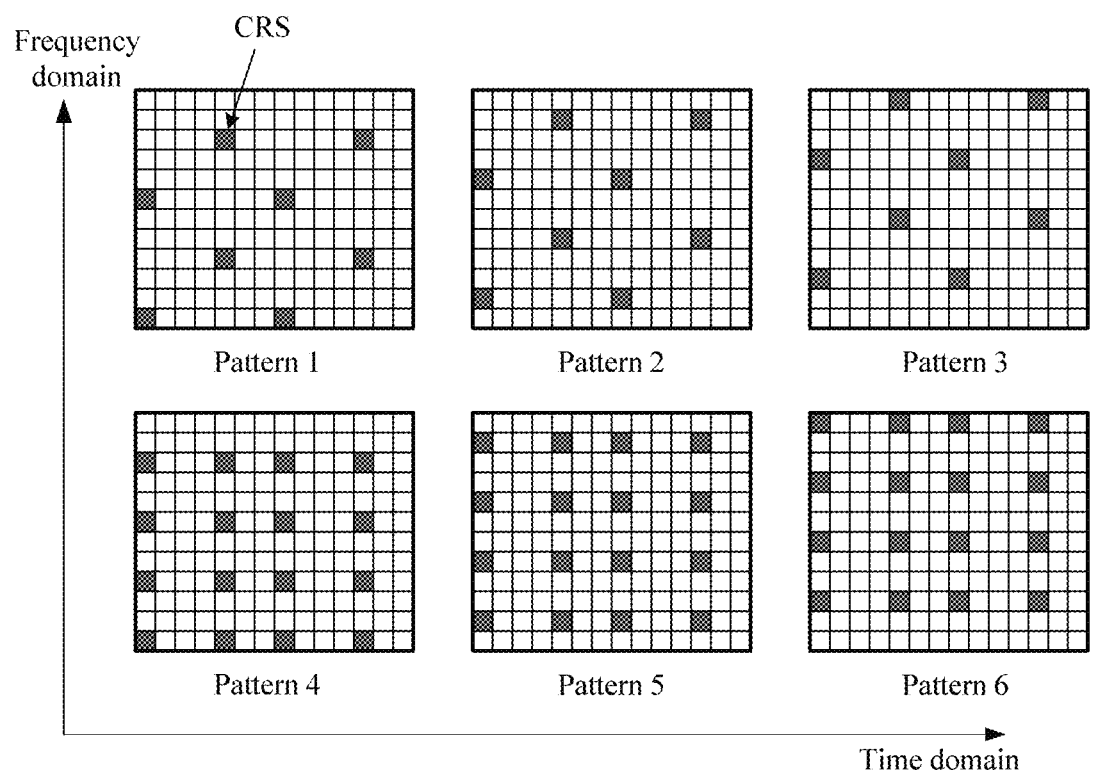
FIG. 6 is a schematic diagram of six patterns of a punctured position of a CRS according to an embodiment of the present invention.

In a possible implementation, a series of patterns are set, and a punctured position is indicated by using a form of a pattern. The pattern may be constructed by using a flexible granularity. For example, in time domain, the pattern may be constructed by using a granularity of an OFDM symbol (or referred to as a symbol), a slot, a subframe, or the like. In frequency domain, the pattern may be constructed by using a granularity of a full bandwidth, a half PRB, one PRB, several subcarriers, or the like. In FIG. 6, a granularity of two PRBs is used as an example for description.

FIG. 6 is a schematic diagram of six patterns of a punctured position of a CRS according to an embodiment of the present invention. As shown in FIG. 6, it is assumed that when there is one LTE antenna, patterns of the punctured position of the CRS includes a pattern 1, a pattern 2, and a pattern 3, and when there are two LTE antennas, patterns of the punctured position of the CRS includes a pattern 4, a pattern 5, and a pattern 6. A small shadow block in the figure represents a position of the CRS, namely, the punctured position. A case in which there is another quantity of antennas, for example, there are four antennas, is similar to the foregoing cases. Various fixed patterns may be preconfigured on UE. A base station may notify the UE of a pattern identifier (ID), and the UE determines a currently used pattern based on the pattern ID, so as to determine the punctured position. For example, if the pattern ID received by the UE from the base station is equal to 5, it can be determined that a currently used pattern is the pattern 5, and the punctured position is determined based on the pattern 5.

Optionally, one reference pattern may be defined for each quantity of antennas. For example, the pattern 1 in FIG. 6 is defined as a reference pattern for one antenna. Other patterns may be obtained by shifting the reference pattern. A currently used pattern may be obtained from the reference pattern by setting a shift value. For example, the pattern 2 is obtained by upward shifting the pattern 1 by one grid, and the pattern 3 is obtained by upward shifting the pattern 1 by two grids. Alternatively, the pattern 3 in FIG. 6 may be defined as a reference pattern for two antennas, and a shift manner of other patterns is similar to the foregoing manner.

Optionally, one reference pattern may be defined for a plurality of quantities of antennas. The base station may notify the UE of a shift value and a quantity of antennas, and the UE derives more pattern forms based on the shift value and the quantity of antennas in combination with the reference pattern. The UE may obtain a plurality of pattern forms based on the shift value, the quantity of antennas, and the reference pattern at an initial stage of accessing a communications system, that is, before receiving a carrier, and performs configuration, or may derive a currently used pattern only when receiving a carrier. A shift value in frequency domain may also be obtained through calculation of a physical cell ID. In other words, the UE may also obtain the shift value based on the physical cell ID. The quantity of antennas may also be obtained based on, for example, a pilot density. In other words, the UE may obtain a corresponding pattern with reference to a reference pattern and the pilot density. For example, the pattern 1 in FIG. 6 is a reference pattern, and if the pattern 6 needs to be obtained, the base station may set the shift value to 2, set the pilot density to 2, and notify the UE of the parameters. The UE may shift the reference pattern upward by two REs based on that the shift value is equal to 2, and multiply a density of the reference pattern by 2 based on the pilot density, to obtain the pattern 6.

For setting of a shift value of a pattern, shift may be performed in frequency domain by using a subcarrier as a granularity, or shift may be performed in time domain by using an OFDM symbol (or referred to as a symbol) as a granularity, or shift may be performed in both frequency domain and time domain. If a punctured position is obtained by shifting a reference pattern in time domain, a shift value in time domain is notified to the UE; if the punctured position is obtained by shifting the reference pattern in frequency domain, a shift value in frequency domain is notified to the UE; or if the punctured position is obtained by shifting the reference pattern in time domain and frequency domain, shift values in time domain and frequency domain are notified to the UE.

A second case of determining a punctured position at which a CSI-RS of a carrier 1 (LTE carrier) is located is described below.

Figure 7:
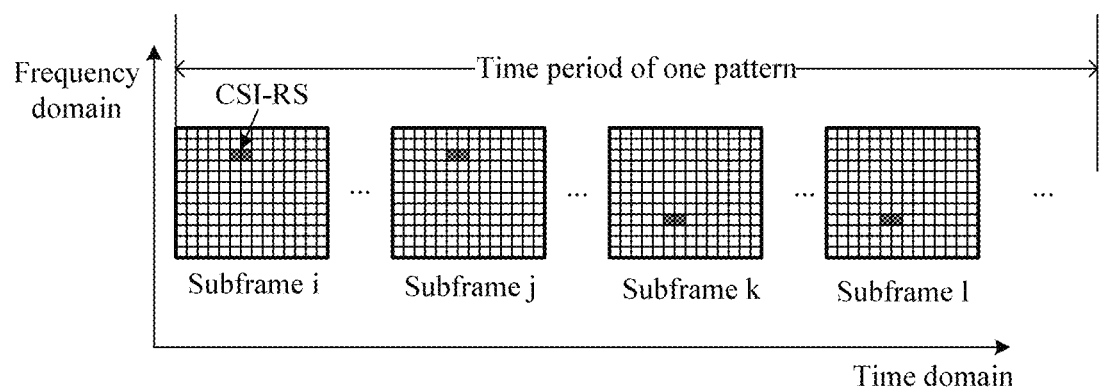
FIG. 7 is a schematic diagram of a pattern of a punctured position of a CSI-RS according to an embodiment of the present invention.

A position of a CSI-RS of an LTE carrier includes positions, in time domain and frequency domain, in the subframe (or the slot) in which the CSI-RS is located. Optionally, the punctured position of the CSI-RS of the LTE carrier may alternatively be indicated by using a fixed pattern. FIG. 7 is a schematic diagram of a pattern of a punctured position of a CSI-RS according to an embodiment of the present invention. As shown in FIG. 7, a CSI-RS appears for four times in one period, and occupies two REs each time. Similar to the first case, a base station may notify UE of a pattern ID, and the UE determines a currently used pattern based on the pattern ID, to determine a punctured position. Alternatively, a reference pattern may be defined, and the base station also needs to notify the UE of a shift value.

Optionally, the pattern of the punctured position of the CSI-RS and the pattern of the punctured position of the CRS may be indicated by using different patterns, or may be indicated by using one pattern. That is, the pattern shown in FIG. 6 and the pattern shown in FIG. 7 may be two separate patterns, or may be combined into one pattern.

A third case of determining a punctured position at which a reference signal (RS) of a carrier 1 (LTE carrier) is located is described below.

In a possible implementation, the punctured position of the RS of the LTE carrier is calculated by using a formula. The RS may include a reference signal, for example, a CRS or a CSI-RS, and punctured position distribution of the RS of the LTE carrier may be obtained through calculation by using the following formula:

$$ZP(k,l)=f(S_{sc},S_{os},M,i_{tti},B,\ldots).$$

where k,l is time-frequency position coordinates of a subframe in which the RS is located, that is, a $k^{th}$ OFDM symbol and an $1^{th}$ subcarrier. Physical parameters for calculating k,l may include one or more of the following parameters: $S_{os}$, $S_{sc}$, M, $i_{tti}$, B, . . . , and the like. $S_{os}$ represents a quantity of symbols shifted in time domain, $S_{sc}$ represents a quantity of subcarriers shifted in frequency domain (or a physical cell ID), M represents an antenna port quantity (or a pilot density or a density index), $i_{tti}$ represents a subframe number, and B represents an overlapping bandwidth. The parameters may further include, for example, a slot number, and a frame number. The base station sends any one or more of the foregoing parameters to the UE, so that the UE calculates k,l, and further learns the punctured position of the RS of the LTE carrier. Optionally, the base station may alternatively calculate the punctured position of the RS of the LTE carrier based on the foregoing formula, and then notifies the UE of the punctured position of the RS.

A fourth case of determining a punctured position at which a control region signal of a carrier 1 (LTE carrier) is located is described below.

Figure 8:
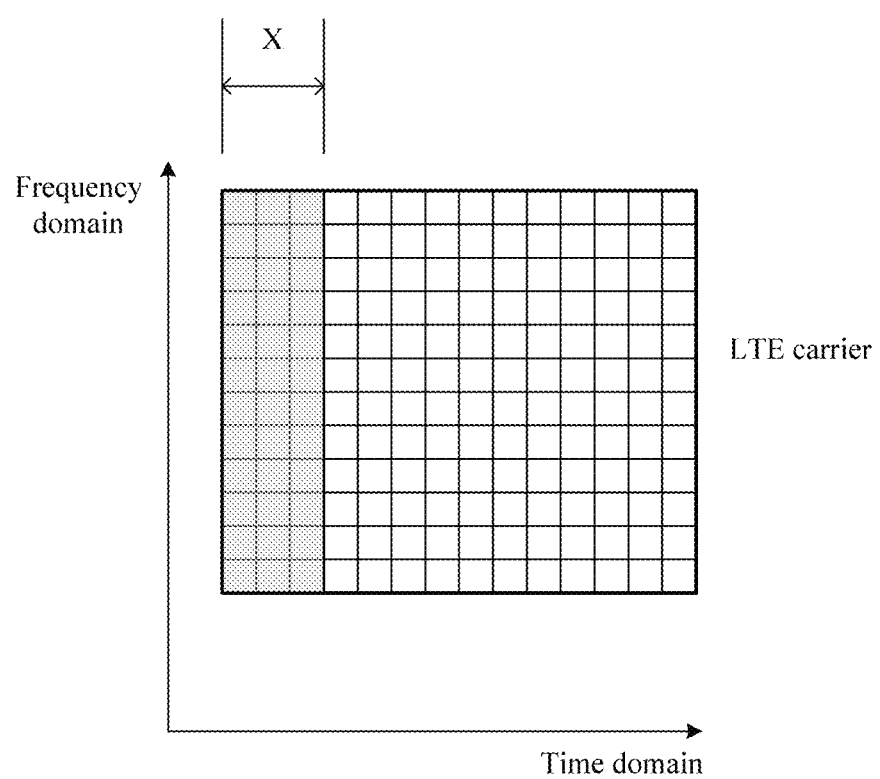
FIG. 8 is a schematic diagram of a manner of indicating a control region signal according to an embodiment of the present invention.

A control region signal of an LTE carrier is usually located on first one to three symbols of each subframe, that is, may occupy one symbol, two symbols, or three symbols. FIG. 8 is a schematic diagram of a manner of indicating a control region signal according to an embodiment of the present invention. As shown in FIG. 8, the control region signal of the LTE carrier occupies first X signals of a subframe. When the punctured position of the control region signal of the LTE carrier is determined, a quantity X of symbols occupied by the control region signal of the LTE carrier at this moment may be notified to UE. In some specific scenarios, for example, for a subframe configured for a multimedia broadcast multicast service single frequency network (MBSFN), the control region signal of the LTE carrier is fixed first two symbols of the subframe, that is, X is fixed at 2 and does not change with a scheduling condition of each TTI. Therefore, a base station may notify the UE of the quantity X of symbols by using, for example, a broadcast message, a master information block (MIB), or a system information block (SIB) at an initial stage of access by the UE to a communications system.

Figure 9:
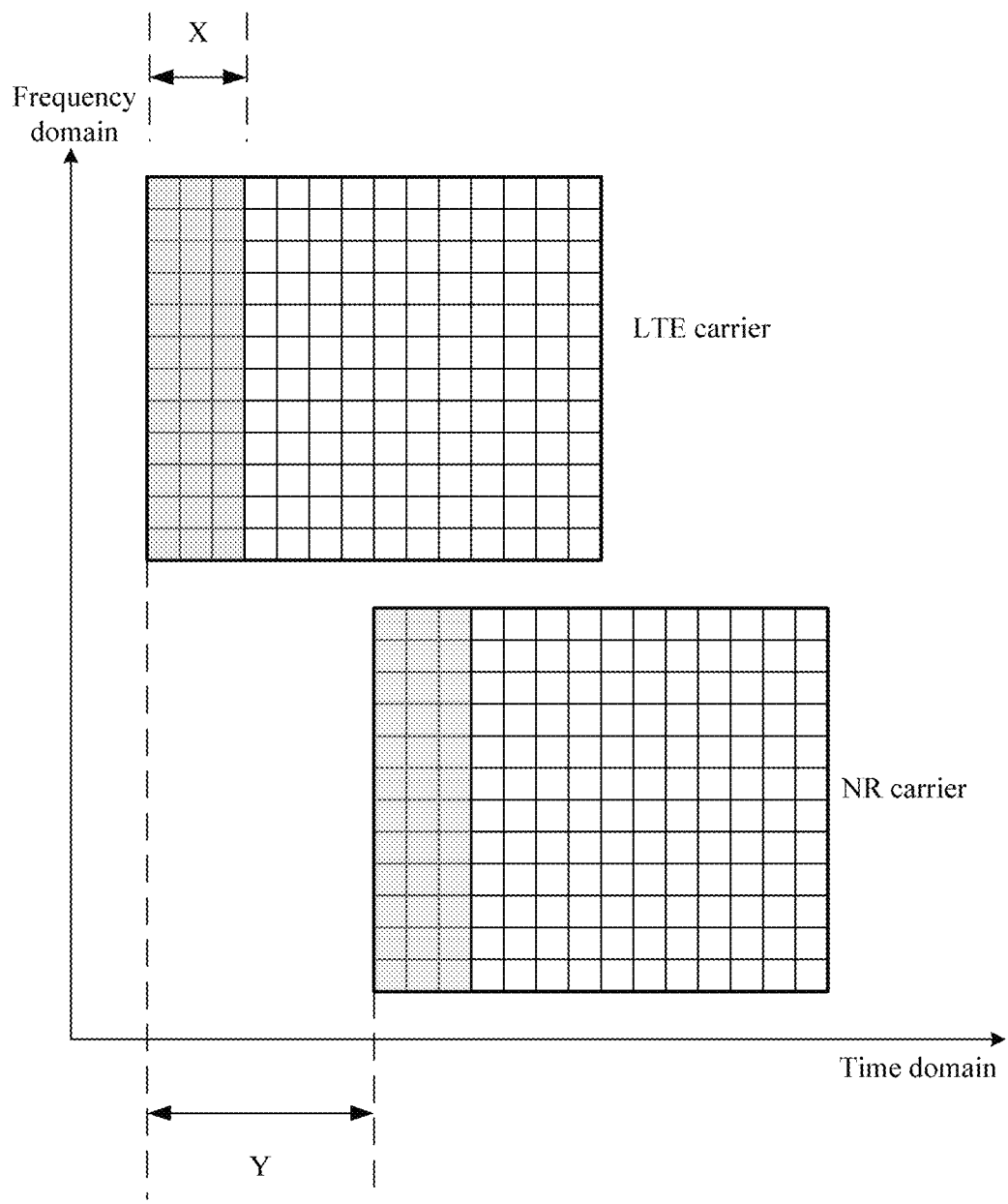
FIG. 9 is a schematic diagram of a manner of indicating a control region signal according to an embodiment of the present invention.

FIG. 9 is a schematic diagram of a manner of indicating a control region signal according to an embodiment of the present invention. Optionally, as shown in FIG. 9, in a scenario in which a control region signal of an NR carrier is also located on first 1 to n symbols of a subframe, an LTE carrier and the NR carrier may be staggered by Y symbols in time domain. In this case, a base station may notify UE of a quantity X of symbols of the control region signal of the LTE carrier and a quantity Y of shifted symbols. Likewise, the base station may notify the UE of X and Y by using, for example, a broadcast message, at an initial stage of access by the UE.

Figure 10:
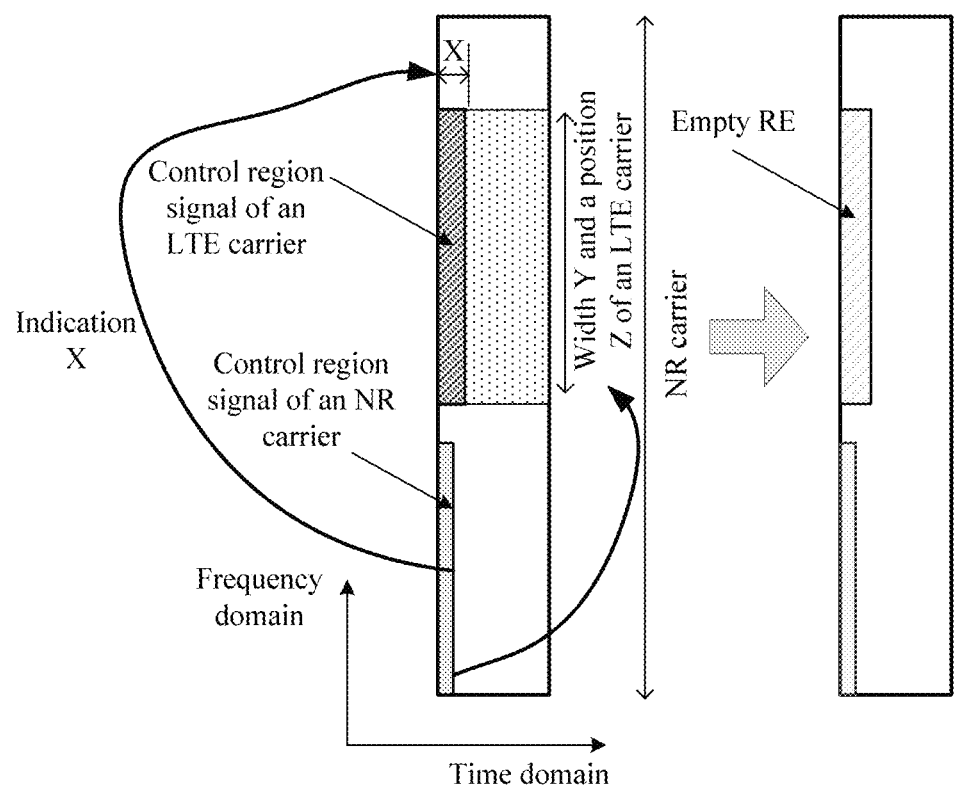
FIG. 10 is a schematic diagram of a manner of indicating a control region signal according to an embodiment of the present invention.

Optionally, when a carrier 1 and a carrier 2 partially overlap or excessively overlap, a manner of indicating a control region shown in FIG. 10 may be used. FIG. 10 is a schematic diagram of a manner of indicating a control region signal according to an embodiment of the present invention. As shown in FIG. 10, both a control region signal of an LTE carrier and a control region signal of an NR carrier appear on OFDM symbols of a first part of a subframe. Therefore, to avoid mutual interference between the control region signals of the two carriers, a position of the control region signal (for example, a PDCCH) of the LTE carrier in frequency domain may be separated from a position of the control region signal (for example, a PDCCH) of the NR carrier in frequency domain by using FDM. In FIG. 10, the control region signal of the LTE carrier and the control region signal of the NR carrier do not overlap in frequency domain. In this case, the base station may notify UE of a quantity X of symbols of the control region signal of the LTE carrier in time domain, a width Y of the control region signal of the LTE carrier in frequency domain, and a position Z of the control region signal of the LTE carrier. For example, the base station may indicate, in the control region signal (for example, downlink control information) of the NR carrier, the quantity X of symbols occupied by the control region signal of the LTE carrier, the width Y of the control region signal of the LTE carrier in frequency domain, and the position Z of the control region signal of the LTE carrier. The position Z of the control region signal of the LTE carrier may be indicated by using a start frequency-domain position, a start PRB position, a start subcarrier position, and the like of the control region signal. The UE receives downlink control information including information about X, Y, and Z, and may obtain values of X, Y, and Z by demodulating the downlink control information. Therefore, the UE may determine the punctured position of the LTE control region based on the values of X, Y, and Z. The punctured position is, for example, an empty RE shown in FIG. 10.

Figure 11:
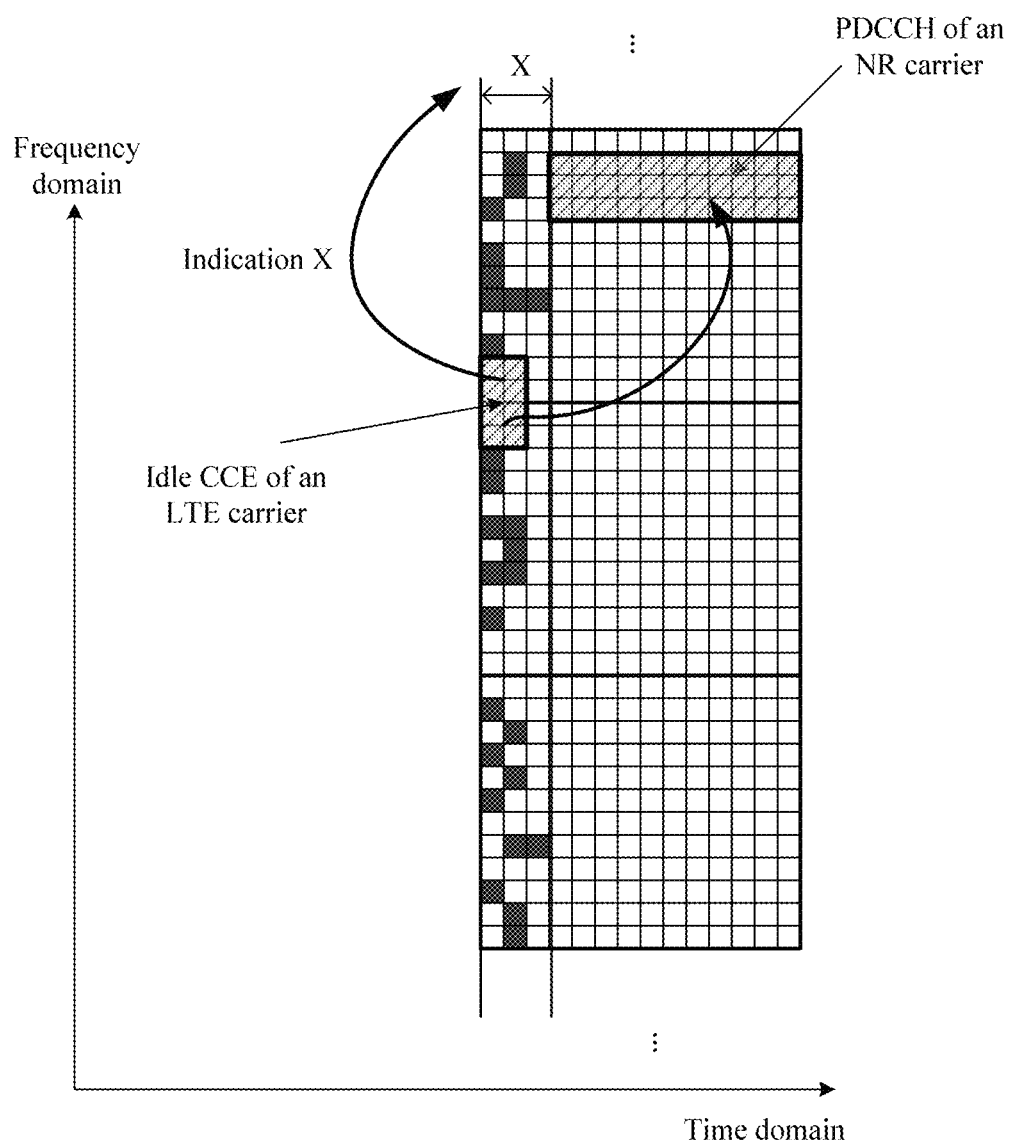
FIG. 11 is a schematic diagram of a manner of indicating a control region signal according to an embodiment of the present invention.

Optionally, when the control region of the carrier 1 and the control region of the carrier 2 overlap, a manner of indicating a control region shown in FIG. 11 may be used. FIG. 11 is a schematic diagram of a manner of indicating a control region signal according to an embodiment of the present invention. As shown in FIG. 11, when a control region signal of an LTE carrier and a control region signal of an NR carrier overlap, when scheduling control information of the control region, a base station may enable, by scheduling control information of the LTE carrier, some idle CCE resources not to be occupied, for scheduling the control region signal of the NR carrier (for example, downlink control information). In addition, the base station may add, to the downlink control information of the NR carrier, a quantity X of symbols occupied by the control region of the LTE carrier. Optionally, the base station may also add, to the downlink control information of the NR carrier, a pattern ID, a width Y of the control region of the LTE carrier in frequency domain, and a position Z of the control region of the LTE carrier, for calculating information such as a physical parameter of an RS position. Optionally, the downlink control information of the NR carrier may also carry information indicating a position of the control region of the NR carrier, for indicating the position of the control region of the NR carrier. Alternatively, the downlink control information of the NR carrier may directly carry the control region signal of the NR carrier, for example, a PDCCH. After receiving the downlink control information of the NR carrier, UE may obtain X and other values by demodulating the downlink control information. Therefore, the UE may obtain a punctured position of the LTE control region based on X and other values.

Figure 12:
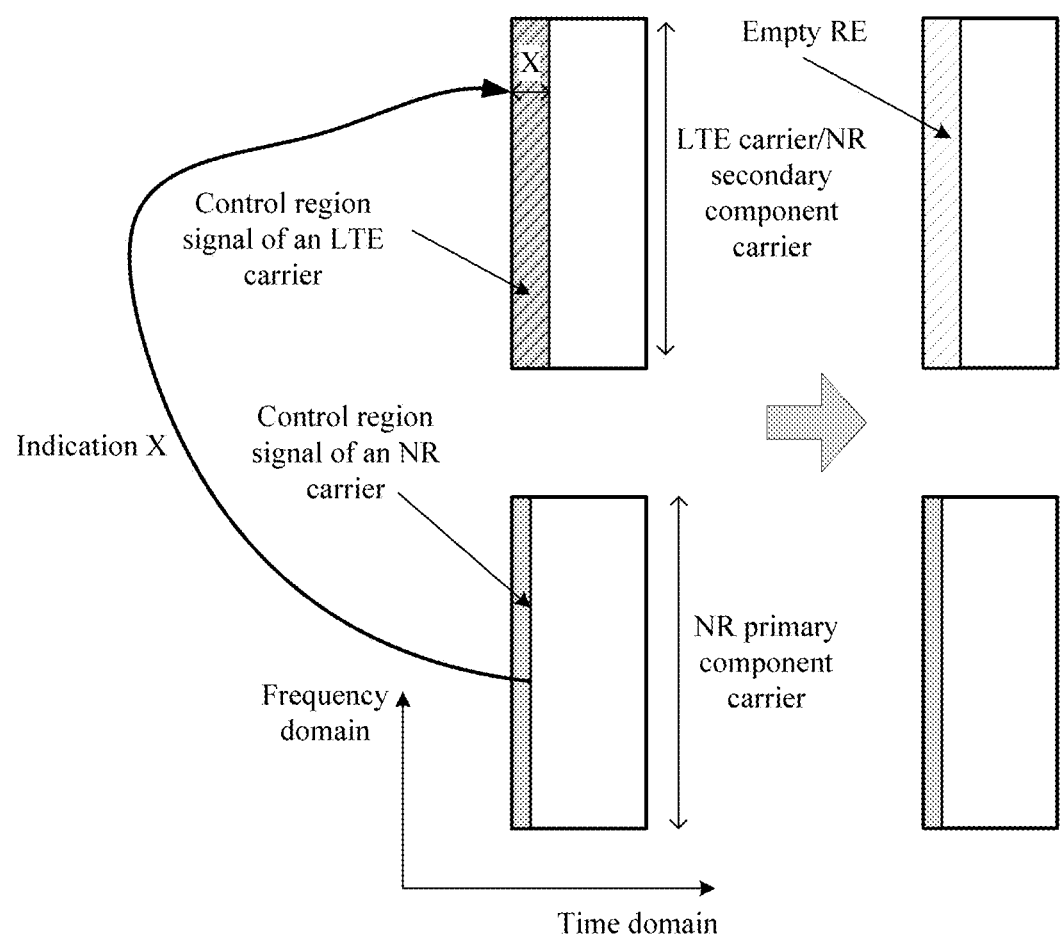
FIG. 12 is a schematic diagram of a manner of indicating a control region signal according to an embodiment of the present invention.

Optionally, when the control region of the carrier 1 and the control region of the carrier 2 completely overlap, a manner of indicating a control region shown in FIG. 12 may be used. FIG. 12 is a schematic diagram of a manner of indicating a control region signal according to an embodiment of the present invention. As shown in FIG. 12, an NR carrier includes an NR primary component carrier and an NR secondary component carrier. The NR primary component carrier and the NR secondary component carrier use a carrier aggregation technology. The NR secondary component carrier and the LTE carrier overlap in a spectrum. For example, a control region of the NR secondary component carrier and a control region of the LTE carrier completely overlap. A base station may close the control region of the NR secondary component carrier. That is, the NR secondary component carrier does not use a resource at an overlapping part between the control regions of the NR secondary component carrier and the LTE carrier. For example, X OFDM symbols in FIG. 12 are all occupied by the control region of the LTE carrier. The base station sends, on the NR primary component carrier aggregated with the NR secondary component carrier, downlink control information to UE. A quantity X of symbols occupied by the control region of the LTE carrier is added to the downlink control information. After receiving the downlink control information of the NR primary component carrier, the UE may obtain a value of X by demodulating the downlink control information, to determine a punctured position of the LTE control region. For example, the punctured position is an empty RE shown in FIG. 12.

In addition, because the LTE carrier and the NR carrier have an overlapping resource, the NR carrier may also use an idle resource on the LTE carrier, so that an NR service can also be sent, thereby improving a resource utilization rate.

It should be noted that the foregoing four manners of determining a punctured position of an LTE signal may be combined with each other for use. The embodiments of the present invention may also be obtained through simple variants of the foregoing four implementations. Therefore, the embodiments of the present invention are not limited to the foregoing four implementations. In the foregoing four cases, for the network architectures and communication manners of the base station and the UE, reference may be made to the communications system 100 in the embodiments shown in FIG. 1A, FIG. 1B, and FIG. 1C. In the foregoing four cases, the base station may support both the LTE system and the NR system at a time, or may support one of the systems at a time. In the foregoing four cases, the UE may support the LTE system and the NR system at a time, or may support one of the systems at a time.

Figure 13:
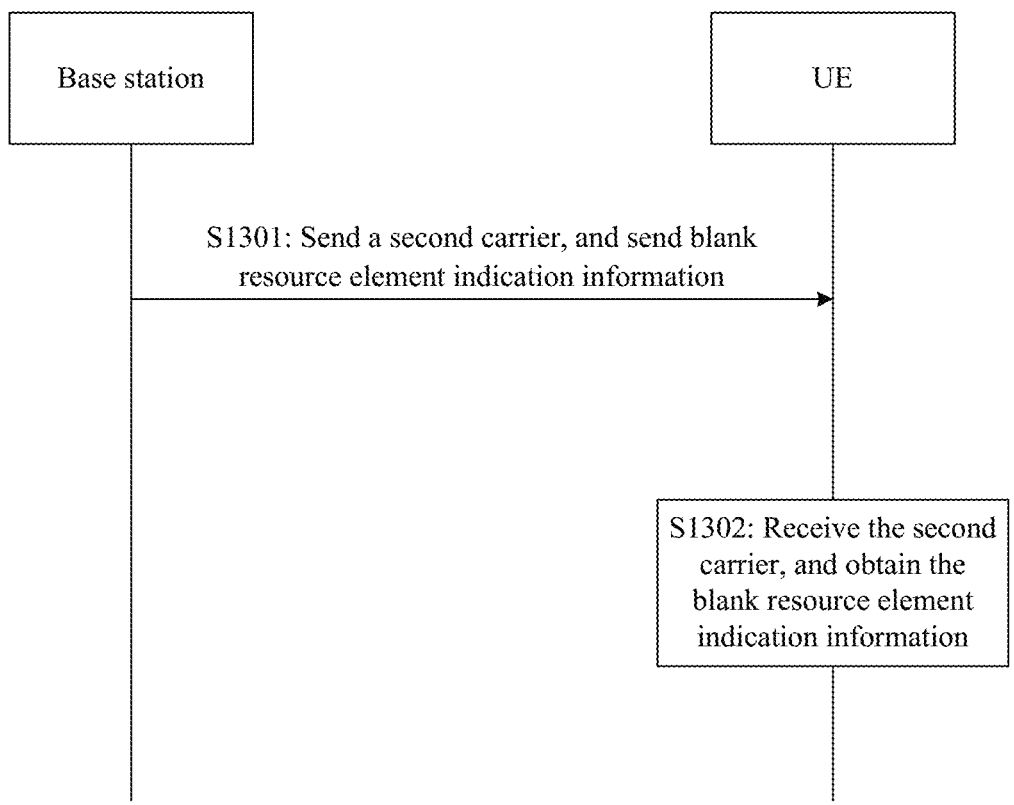
FIG. 13 is a schematic diagram of signaling interaction in a method for transmitting a carrier according to an embodiment of the present invention.

FIG. 13 is a schematic diagram of signaling interaction in a method for transmitting a carrier according to an embodiment of the present invention. As shown in FIG. 13, the method may be performed through cooperation between a base station and UE, and includes the following steps.

S1301: The base station sends a second carrier, where the second carrier at least partially shares a same resource area with a first carrier, the resource area includes a plurality of resource elements, and the first carrier and the second carrier occupy different resource elements; and the base station sends blank resource element indication information to the user equipment that receives the second carrier, where the blank resource element indication information is used to indicate a position of a resource element occupied by the first carrier in the shared resource area.

S1302: The user equipment receives the second carrier, where the second carrier at least partially shares a same resource area with the first carrier, the resource area includes a plurality of resource elements, and the first carrier and the second carrier occupy different resource elements; and the user equipment obtains the blank resource element indication information, where the blank resource element indication information is used to indicate a position of a resource element occupied by the first carrier in the shared resource area.

The first carrier and the second carrier may be carriers from different systems. For example, the first carrier comes from an LTE system, and the second carrier comes from an NR system. Alternatively, the first carrier comes from an NR system, and the second carrier comes from an LTE system. Certainly, the embodiments of the present invention are described by using the two systems as an example, but are not limited to the two systems, and may also include, for example, a CDMA system, a TDMA system, and an OFDMA system. The first carrier and the second carrier may alternatively come from a same system, for example, both come from the LTE system, or both come from the NR system. The first carrier and the second carrier may come from a same base station, and are respectively sent to two different UEs. For example, in FIG. 1C, the base station 22 sends the first carrier to the UE 40A, and sends the second carrier to the UE 40B. The first carrier and the second carrier may come from different base stations, and are respectively sent to two different UEs. FIG. 1C is still used as an example, the base station 22 sends the first carrier to the UE 40A, and the base station 20 sends the second carrier to the UE 40C. Certainly, the first carrier and the second carrier may alternatively be sent to same UE by a same base station or different base stations.

The first carrier and the second carrier may share a same resource area. For example, the first carrier and the second carrier may partially overlap, completely overlap, or excessively overlap in a spectrum resource. A spectrum resource utilization rate may be improved in a manner of sharing a spectrum resource.

A resource area may be formed by using a flexible granularity. For example, in time domain, the resource area may be constructed by using a granularity of an OFDM symbol (or referred to as a symbol), a slot, a subframe, or the like. In frequency domain, the resource area may be constructed by using a granularity of a full bandwidth, a half PRB, one PRB, several subcarriers, or the like. The resource area may alternatively be a resource area in space domain. The resource element may include an RE, an OFDM symbol, a subcarrier, and the like. The resource element may further include a basic constituent unit of a resource area of another form.

The blank resource element indication information may be position indication information of a resource element, and is used to indicate a position of the resource element occupied by the first carrier in the shared resource area. The position of the resource element occupied by the first carrier in the shared resource area may include, for example, punctured positions of a control region signal, a pilot channel, and a reference signal of the first carrier. Resource elements at these positions may also be referred to as ZP-REs, muted REs, empty symbols, and empty REs. Optionally, the blank resource element indication information may include a pattern ID, used to indicate a pattern identifying a punctured position, for example, a pattern of a punctured position of a CRS, or a pattern of a punctured position of a CSI-RS in the foregoing descriptions. Optionally, the blank resource element indication information may also include one or more physical parameters for calculating the punctured position of the RS, or information about the punctured position of the RS. Optionally, the blank resource element indication information may further include a quantity X of symbols occupied by a control region signal, and a width Y of the control region signal in frequency domain, and a position Z of the control region signal.

The base station may notify the UE of the blank resource element indication information in a plurality of implementations. For example, at an initial stage of access of the UE to the system, the base station notifies the UE by adding the blank resource element indication information to a broadcast message, a system message, or the like. Alternatively, the base station may also notify the UE by adding the blank resource element indication information to the control region signal (for example, downlink control information) of the second carrier. The UE may determine, based on the blank resource element indication information, the position of the resource element occupied by the first carrier in the shared resource area, that is, the punctured position. At these positions, the base station sends no power, and the UE receives no signal, so that it can be ensured that the first carrier is not interfered.

In the embodiments of the present invention, the first carrier and the second carrier may share a resource through carrier overlapping, to improve a resource utilization rate. In addition, the base station notifies the UE of the blank resource element indication information for indicating the position of the resource element occupied by the first carrier in the shared resource area, so that the UE can determine the position of the resource element occupied by the first carrier in the shared resource area, and the UE receives no signal or sets receive power to zero at these positions, thereby avoiding causing interference to the first carrier.

In the foregoing embodiments provided in the present invention, various solutions, such as the method for transmitting a carrier, the manner of determining a punctured position, and the manner of notifying information about a punctured position provided in the embodiments of the present invention are described from a perspective of interaction between network elements. It may be understood that, to implement the foregoing functions, the network elements, for example, the UE and the base station, include corresponding hardware structures and/or software modules for implementing the functions. A person of ordinary skill in the art should be easily aware that, the units and algorithm steps in the examples described with reference to the embodiments disclosed in this specification may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

Figure 14:
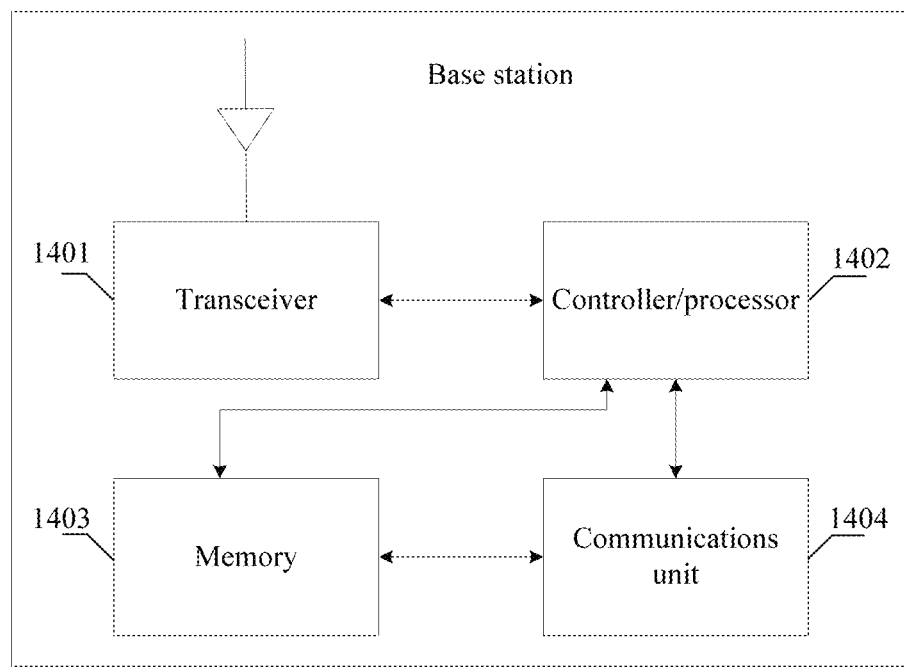
FIG. 14 is a schematic structural diagram of a base station according to an embodiment of the present invention.

FIG. 14 is a possible schematic structural diagram of the base station in the foregoing embodiments. The base station may be the base station 20, the base station 22, or the base station 24 shown in FIG. 1A, FIG. 1B, and FIG. 1C.

The shown base station includes a transceiver 1401 and a controller/processor 1402. The transceiver 1401 may be configured to support information sending and receiving between the base station and the UE in the foregoing embodiments. The controller/processor 1402 may be configured to implement various functions for communicating with UE and other network devices. On an uplink, an uplink signal from the UE is received by using an antenna, and is demodulated by using the transceiver 1401, and is further processed by using the controller/processor 1402 to recover service data and signaling sent by the UE. On a downlink, the service data and the signaling message are processed by using the controller/processor 1402, and are demodulated by using the transceiver 1401 to generate a downlink signal, which is transmitted to the UE by using the antenna.

For example, the method for sending a carrier in the embodiments of the present invention may be implemented through cooperation between the transceiver 1401 and the controller/processor 1402. For example, the transceiver 1401 is configured to send a second carrier, where the second carrier at least partially shares a same resource area with a first carrier, the resource area includes a plurality of resource elements, and the first carrier and the second carrier occupy different resource elements. The controller/processor 1402 is configured to generate blank resource element indication information. The transceiver 1401 sends the blank resource element indication information to user equipment that receives the second carrier, where the blank resource element indication information is used to indicate a position of a resource element occupied by the first carrier in the shared resource area. The base station may further include a memory 1403, which may be configured to store program code and data of the base station. The base station may further include a communications unit 1404, configured to support the base station in performing communication with other network entities.

It can be understood that FIG. 14 shows only a simplified design of a base station. In actual application, the base station may include any quantity of transmitters, receivers, processors, controllers, memories, communications units, and the like. All base stations that can implement the present invention fall within the protection scope of the present invention.

Figure 15:
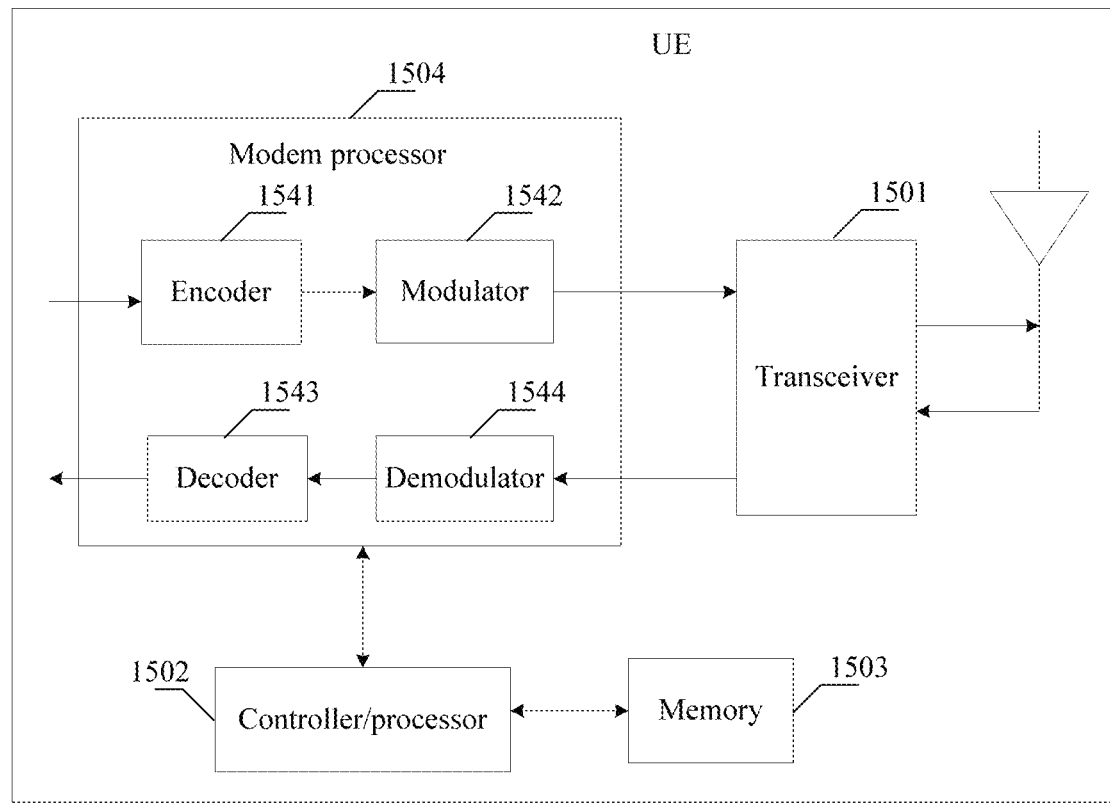
FIG. 15 is a schematic structural diagram of UE according to an embodiment of the present invention.

FIG. 15 is a simplified schematic diagram of a possible design structure of UE in the foregoing embodiments. The UE may be, for example, one of the UE 40A to the UE 40E shown in FIG. 1A, FIG. 1B, and FIG. 1C. The UE includes a transceiver 1501 and a controller/processor 1502, and may further include a memory 1503 and a modem processor 1504.

The transceiver 1501 adjusts (for example, performs analog conversion, filtering, amplification, and up-conversion on) output sampling and generates an uplink signal, and the uplink signal is transmitted to the base station in the foregoing embodiments by using an antenna. On a downlink, an antenna receives a second carrier sent by the base station in the foregoing embodiments. The transceiver 1501 adjusts (for example, performs filtering, amplification, down-conversion, and digitization on) a signal received from the antenna and provides input sampling. In the modem processor 1504, an encoder 1541 receives service data and a signaling message that are to be sent on the uplink, and processes (for example, performs formatting, encoding, and interleaving on) the service data and the signaling message. A modulator 1542 further processes (for example, performs symbol mapping and modulation on) encoded service data and an encoded signaling message, and provides output sampling. A demodulator 1544 processes (for example, demodulates) the input sampling and provides symbol estimation. A decoder 1543 processes (for example, de-interleaves and decodes) the symbol estimation and provides decoded data and a decoded signaling message that are sent to the UE. The encoder 1541, the modulator 1542, the demodulator 1544, and the decoder 1543 may be implemented by using the synthesized modem processor 1504. These units perform processing based on radio access technologies (for example, access technologies of an LTE system and another evolved system) used by a radio access network.

For example, the method for sending a carrier in the embodiments of the present invention may be implemented through cooperation between the transceiver 1501 and the modem processor 1504 (or the controller/processor 1502). Optionally, the method may alternatively be implemented through cooperation between the transceiver 1501, the controller/processor 1502, and the modem processor 1504. For example, the transceiver 1501 is configured to receive a second carrier, where the second carrier at least partially shares a same resource area with a first carrier, the resource area includes a plurality of resource elements, and the first carrier and the second carrier occupy different resource elements. The modem processor 1504 is configured to obtain blank resource element indication information, where the blank resource element indication information is used to indicate a position of a resource element occupied by the first carrier in the shared resource area. The controller/processor 1502 may also control and manage an action of the UE, for executing processing performed by the UE in the foregoing embodiments. For example, the controller/processor 1502 is configured to support the UE in executing content related to the UE in the S1302 part of FIG. 13. The memory 1503 is configured to store program code and data of the UE.

The controller/processor for executing the foregoing base station or UE in the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. It may implement or execute various examples of logical blocks, modules, and circuits that are described with reference to the contents disclosed in the present invention. The processor may also be a combination of computing functions, for example, a combination of one or more microprocessors or a combination of a DSP and a microprocessor.

The methods or algorithm steps described with reference to the content disclosed in the present invention may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in user equipment. Certainly, the processor and the storage medium may exist in the user equipment as discrete components.

A person of skill in the art should be aware that in one or more of the foregoing examples, the functions described in the present invention may be implemented by using hardware, software, firmware, or any combination thereof. When this application is implemented by software, these functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A method comprises:
    sending, by an apparatus via a second carrier to a terminal, a message indicating a resource region, wherein the resource region is in an overlapping region of the second carrier and a first carrier; and
    communicating, by the apparatus with the terminal, via the second carrier avoiding the resource region.

2. The method according to claim 1, wherein the resource region is not available for communicating with the terminal via the second carrier.

3. The method according to claim 1, wherein the message comprises at least one of following information associated with the first carrier:
    a shift value;
    a quantity of antennas; and
    bandwidth of the first carrier in a frequency domain.

4. The method according to claim 1, the communicating further comprises:
    transmitting, by the apparatus, signaling of the first carrier using the resource region.

5. The method according to claim 4, wherein the signaling of the first carrier comprises cell reference signaling.

6. The method according to claim 1, wherein the resource region comprises at least one resource element.

7. A method comprising:
    receiving, by an apparatus via a second carrier from a network device, a message; and
    communicating, by the apparatus with the network device, via the second carrier avoiding, according to the message, a resource region in an overlapping region of the second carrier and a first carrier.

8. The method according to claim 7, wherein the resource region is not available for communicating with the network device via the second carrier.

9. The method according to claim 7, wherein the message comprises at least one of following parameter for the first carrier:
    a shift value;
    quantity of antennas; and
    bandwidth of the first carrier in a frequency domain.

10. The method according to claim 7, wherein the resource region comprises at least one resource element.

11. An apparatus comprising:
    a non-transitory computer readable storage medium storing instructions; and
    a processor configured to execute the instructions to cause the apparatus to:
        send, via a second carrier to a terminal, a message indicating a resource region, wherein the resource region is in an overlapping region of the second carrier and a first carrier; and
        communicate with the terminal via the second carrier avoiding the resource region.

12. The apparatus according to claim 11, wherein the resource region is not available for the second carrier.

13. The apparatus according to claim 11, wherein the message comprises at least one of following information associated with the first carrier:
    a shift value;
    a quantity of antennas; and
    bandwidth of the first carrier in a frequency domain.

14. The apparatus according to claim 13, wherein the shift value is between a reference cell-specific reference signal (CRS) pattern with the quantity of antennas and a CRS pattern used for CRS transmission.

15. The apparatus according to claim 11, wherein the processor is further configured to execute the instructions to cause the apparatus to:
    transmit signaling of the first carrier using the resource region.

16. The apparatus according to claim 15, wherein the signaling of the first carrier comprises cell reference signaling.

17. The apparatus according to claim 11, wherein the resource region comprises at least one resource element.

18. The apparatus according to claim 11, wherein the message further comprises configuration information of a multimedia broadcast multicast service single frequency network (MBSFN) of the first carrier.

19. An apparatus comprising:
a non-transitory computer readable storage medium storing instructions; and
a processor configured to execute the instructions to cause the apparatus to implement:
receiving via a second carrier from a network device, a message; and
communicating with the network device via the second carrier avoiding, according to the message, a resource region in an overlapping region of the second carrier and a first carrier.

20. The apparatus according to claim 19, wherein the resource region is not available for communicating with the network device via the second carrier.

21. The apparatus according to claim 19, wherein the message comprises at least one of following parameter for the first carrier:
a shift value;
quantity of antennas; and
bandwidth of the first carrier in a frequency domain.

22. The apparatus according to claim 21, wherein the shift value is between a reference cell-specific reference signal (CRS) pattern with the quantity of antennas and a CRS pattern used for CRS transmission.

23. The apparatus according to claim 19, wherein the resource region comprises at least one resource element.

24. The apparatus according to claim 19, wherein the message further comprises configuration information of a multimedia broadcast multicast service single frequency network (MBSFN) of the first carrier.

* * * * *